United States Patent
Seok et al.

(10) Patent No.: US 7,440,070 B2
(45) Date of Patent: Oct. 21, 2008

(54) LIQUID CRYSTAL DISPLAY PANEL WITH FLEXIBLE BARRIER WITHIN OUTER SEAL OF DIFFERING MATERIAL TYPE AND FABRICATION METHOD THEREOF

(75) Inventors: Dae Young Seok, Daegu (KR); Moo Hyoung Song, Daegu (KR)

(73) Assignee: LG Display Co., Ltd., Seoul (KR)

( * ) Notice: Subject to any disclaimer, the term of this patent is extended or adjusted under 35 U.S.C. 154(b) by 273 days.

(21) Appl. No.: 11/003,382

(22) Filed: Dec. 6, 2004

(65) Prior Publication Data
US 2005/0128420 A1 Jun. 16, 2005

(30) Foreign Application Priority Data
Dec. 11, 2003 (KR) .................. 10-2003-0090302

(51) Int. Cl.
*G02F 1/1339* (2006.01)
(52) U.S. Cl. ..................................... 349/153
(58) Field of Classification Search .............. 349/153
See application file for complete search history.

(56) References Cited

U.S. PATENT DOCUMENTS

| 5,103,336 | A  | * | 4/1992  | Sieloff .................... 359/253 |
| 5,858,268 | A  | * | 1/1999  | Niiyama et al. ...... 252/299.01 |
| 6,013,339 | A  | * | 1/2000  | Yamada et al. ........ 428/1.53 |
| 6,552,769 | B2 | * | 4/2003  | Cho et al. ............... 349/153 |
| 6,555,187 | B1 | * | 4/2003  | Kitamura ................ 428/1.53 |
| 6,646,709 | B2 | * | 11/2003 | Matsumoto ............ 349/156 |
| 6,683,670 | B2 | * | 1/2004  | Chung et al. ........... 349/153 |
| 6,937,315 | B2 | * | 8/2005  | Lee et al. ............... 349/153 |
| 7,199,855 | B2 | * | 4/2007  | Yoshimi et al. ........ 349/187 |
| 2002/0060770 | A1 | * | 5/2002  | Chung et al. ........... 349/153 |
| 2004/0027531 | A1 | * | 2/2004  | Kim ....................... 349/187 |
| 2004/0218135 | A1 | * | 11/2004 | Lee et al. ............... 349/156 |

* cited by examiner

*Primary Examiner*—Timothy Rude
(74) *Attorney, Agent, or Firm*—Morgan, Lewis & Bockius LLP

(57) ABSTRACT

A liquid crystal display panel includes first and second substrates being bonded by a sealant, and an elastic barrier formed between the first and second substrates inside the sealant, the elastic barrier and the sealant having a distance therebetween.

5 Claims, 8 Drawing Sheets

LIQUID CRYSTAL DISPLAY PANEL WITH FLEXIBLE BARRIER WITHIN OUTER SEAL OF DIFFERING MATERIAL TYPE AND FABRICATION METHOD THEREOF

The present application claims the benefit of Korean Patent Application No. P2003-90302 filed in Korea on Dec. 11, 2003, which is hereby incorporated by reference.

BACKGROUND OF THE INVENTION

1. Field of the Invention

The present invention relates to a liquid crystal display device, and more particularly to, a liquid crystal display panel and a fabrication method thereof. Although the present invention is suitable for a wide scope of applications, it is particularly suitable for preventing a gravity defect in the liquid crystal display panel.

2. Discussion of the Related Art

In general, liquid crystal display (LCD) devices use optical anisotropy and polarization properties of liquid crystal molecules to generate a desired image. In particular, liquid crystal molecules can be aligned in a specific orientation, which can be controlled by applying an electric field across the liquid crystal molecules. The liquid crystal display generally includes a liquid crystal display panel having liquid crystal cells arranged in a matrix-like manner and a driving circuit for driving the liquid crystal display panel.

In addition, the liquid crystal display panel also includes pixel electrodes for applying electric field to each of the liquid crystal cells and a reference electrode, i.e., a common electrode. Generally, the pixel electrode is formed on a thin film transistor (TFT) array substrate in the liquid crystal cells, and the common electrode is formed on another substrate, i.e., a color filter array substrate. Each of the pixel electrodes is connected to a TFT, which is used as a switching device. Thus, the pixel electrodes along with the common electrode drive the liquid crystal cells to transmit light in accordance with a data signal supplied through the TFTs.

Figure 1:
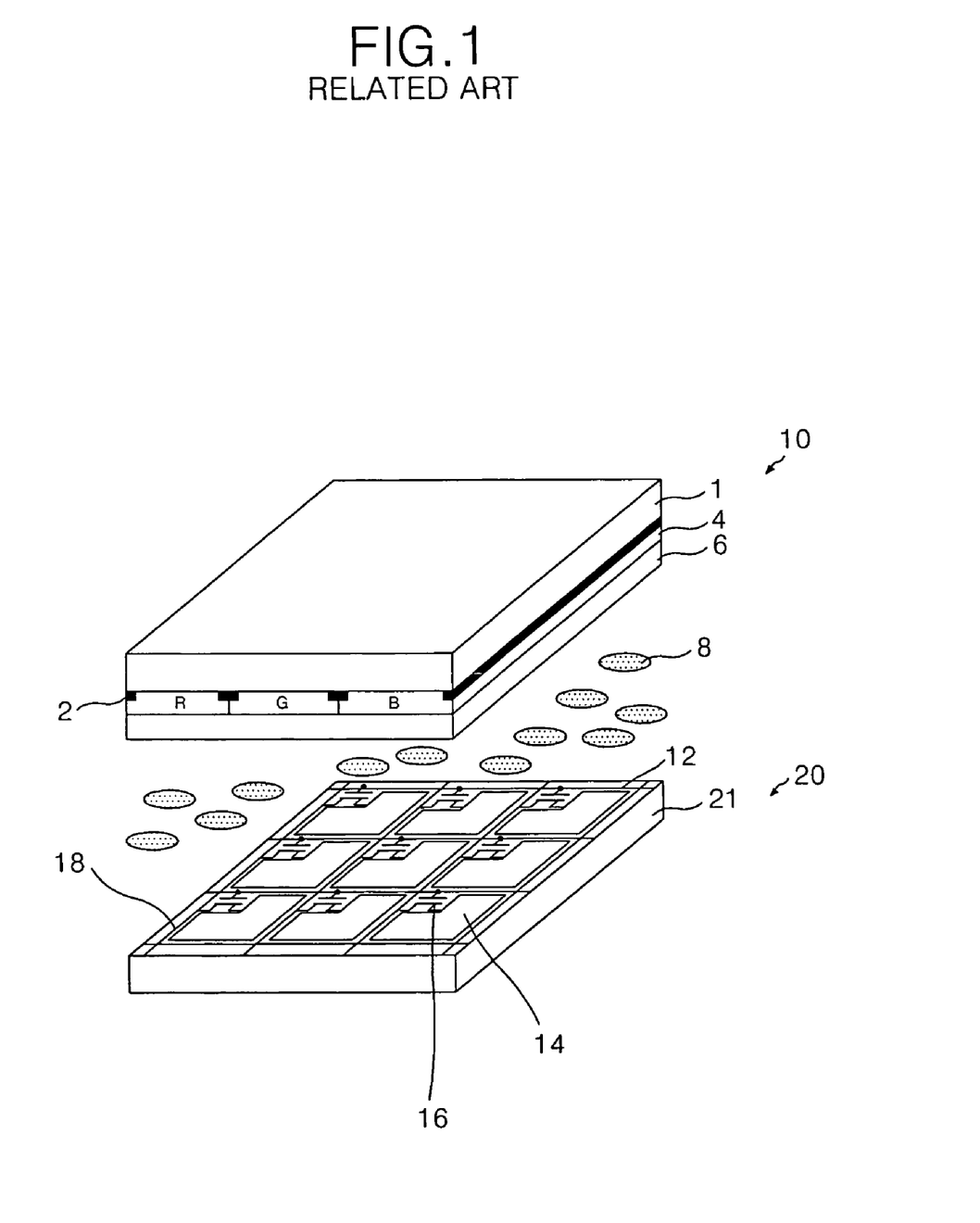
FIG. 1 is an expanded perspective view of a liquid crystal display panel according to the related art.

FIG. 1 is an expanded perspective view of a liquid crystal display panel according to the related art. In FIG. 1, a liquid crystal display panel includes an upper array substrate 10 and a lower array substrate 20 with a liquid crystal material 8 formed therebetween. The upper array substrate 10 is commonly referred to as a color filter array substrate and has a black matrix 2, a color filter 4, common electrode 6 and an upper alignment layer (not shown) formed on a first substrate 1. The color filter 4 includes color filters of red R, green G and blue B to transmit light of specific wavelength ranges, thereby displaying color lights. The black matrix 2 is formed between adjacent color filters 4 to absorb the light incident from the adjacent cells, thereby preventing a color contrast from being deteriorated.

The lower array substrate 20 is commonly referred to as a thin film transistor (TFT) array substrate and has data lines 18, gate lines 12 and a lower alignment layer (not shown) formed on a second substrate 21. The data lines 18 and the gate lines 12 intersect each other, thereby defining a plurality of cell areas. A gate insulating film (not shown) is formed between the data lines 18 and the gate lines 12. A TFT 16 is formed at each intersection between the data lines 18 and the gate lines 12. In particular, the TFT 16 includes a gate electrode connected to a respective one of the gate lines 12, a source electrode connected to a respective one of the data lines 18, and a drain electrode facing the source electrode with a channel region that includes an active layer and an ohmic contact layer. The TFT 16 is electrically connected to the pixel electrode 14, such that the TFT 16 responds to a gate signal from the respective gate line 12 to selectively supply the data signal from the respective data line 18 to the pixel electrode 14.

The pixel electrode 14 is located at each of the cell areas and includes a transparent conductive material having high light transmissivity. The pixel electrode 14 generates a potential difference with the common electrode 6 by the data signal supplied through the drain electrode of the TFT 16. The potential difference causes the liquid crystal material 8 to rotate by dielectric constant anisotropy. Accordingly, the light incident on the liquid crystal panel from a light source (not shown) is transmitted in accordance with the data signal.

Figure 2:
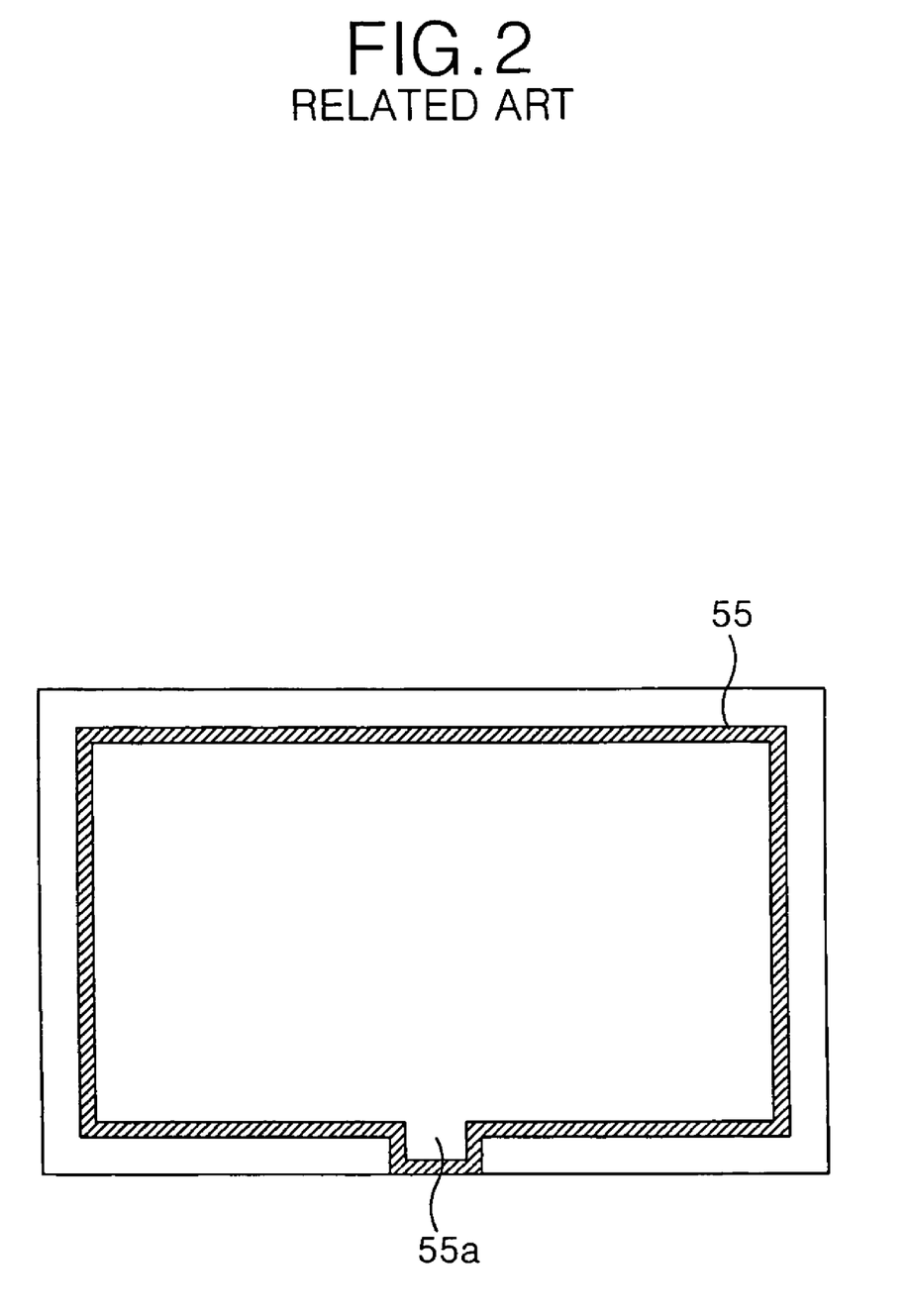
FIG. 2 is a planar view of the liquid crystal display panel shown in FIG. 1.

FIG. 2 is a planar view of the liquid crystal display panel shown in FIG. 1. As shown in FIG. 2, the liquid crystal display panel includes a sealant 55 formed on one of the upper array substrate 10 and the lower array substrate 20 (shown in FIG. 1) to bond the upper and lower array substrates 10 and 20 to each other. The sealant 55 includes a glass fiber and is spread over a peripheral region of the liquid crystal display panel, such that the liquid crystal material 8 (shown in FIG. 1) is formed inside the sealant 55.

Figure 3:
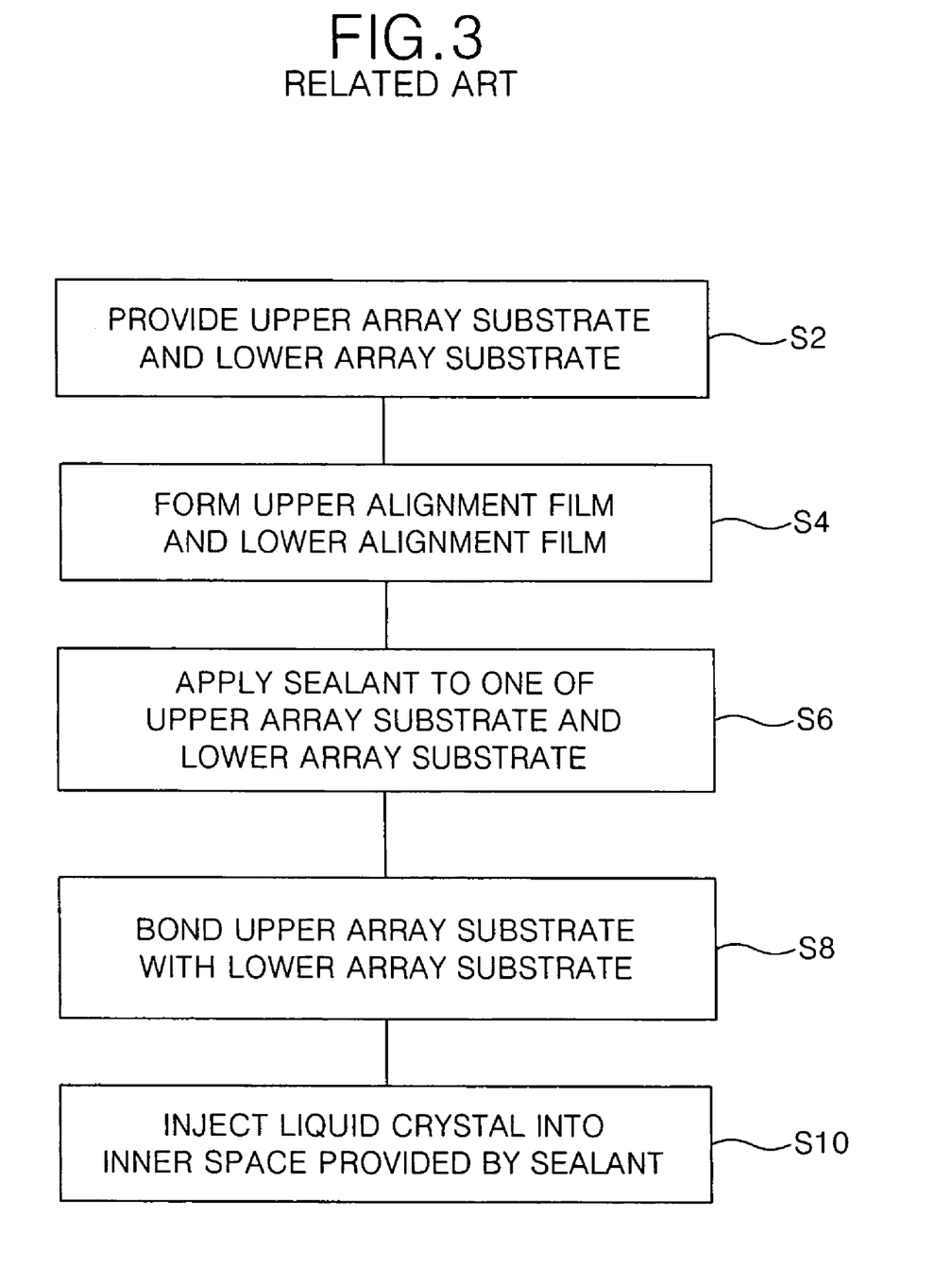
FIG. 3 is a flow chart illustrating a fabricating method of a liquid crystal display panel according to the related art.

FIG. 3 is a flow chart illustrating a fabricating method of a liquid crystal display panel according to the related art. As shown in FIG. 3, at step S2, an upper array substrate and a lower array substrate are provided. For example, the upper array substrate 10 and the lower array substrate 20 (shown in FIG. 1) may be separately prepared, i.e., forming the black matrix 2, the color filter 4, and the common electrode 6 on the first substrate 1, and forming the data lines 18, the gate lines 12, the TFTs 16 and the pixel electrodes 14 on the second substrate 2.

Then, at step S4, an upper alignment film and a lower alignment film are formed on the upper and lower array substrates, respectively. For example, the upper alignment film is formed on the first substrate 1 over the black matrix 2, the color filter 4, and the common electrode 6 (shown in FIG. 1), and the lower alignment film is formed on the second substrate 21 over the data lines 18, the gate lines 12, the TFTs 16 and the pixel electrodes 14 (shown in FIG. 1).

Further, at step S6, a sealant is applied on one of the upper array substrate and the lower array substrate. For example, the sealant 55 (shown in FIG. 2) is formed on one of the first substrate 1 and the second substrate 21 (shown in FIG. 1). Then, at step S8, the upper and lower array substrates are bonded to each other. For example, the first and second substrates 1 and 21 (shown in FIG. 1) are bonded to each other by the sealant 55 (shown in FIG. 2).

In addition, at step S10, a liquid crystal material is injected into a space inside the sealant between the upper and lower array substrates. For example, the liquid crystal material 8 is injected between the first and second substrates 1 and 21 (shown in FIG. 1).

Figure 4:
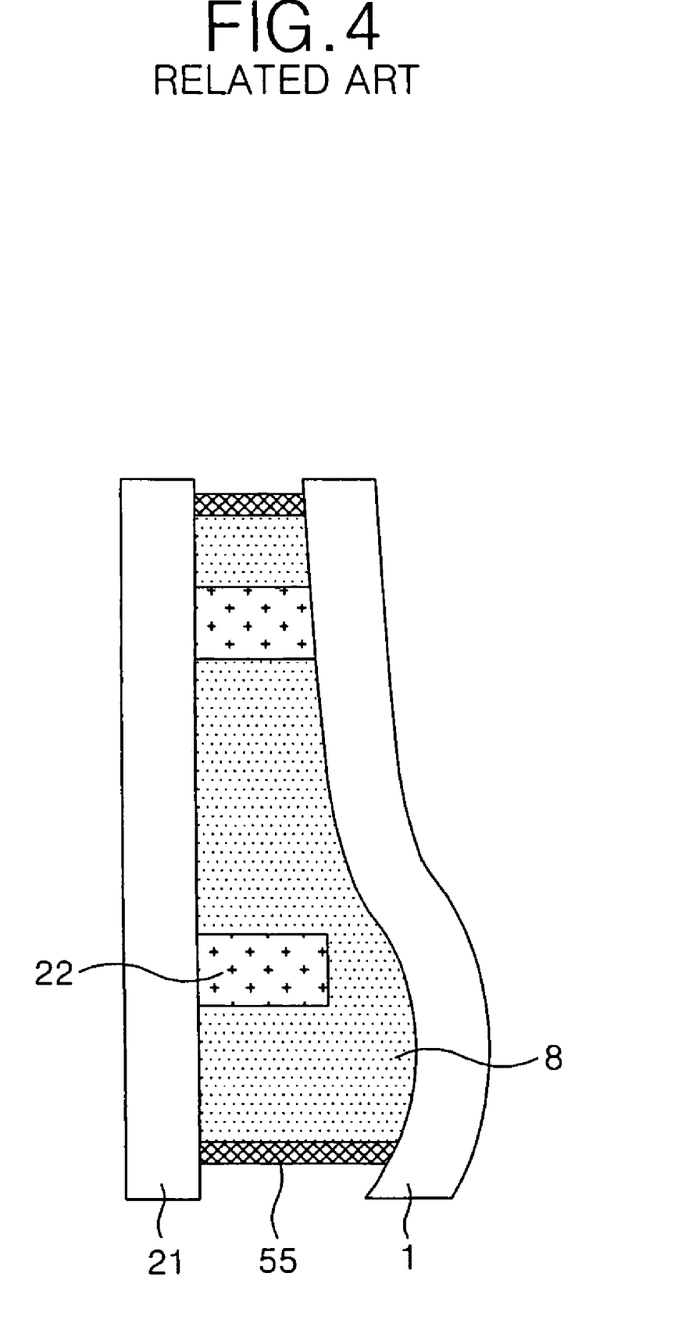
FIG. 4 is a diagram showing a gravity defect in the liquid crystal display panel shown in FIG. 1.

FIG. 4 is a diagram showing a gravity defect in the liquid crystal display panel shown in FIG. 1. As shown in FIG. 4, the liquid crystal display panel includes a spacer 22 to maintain a cell gap between the first and second substrates 1 and 21. In particular, the liquid crystal material 8 is injected in the cell gap maintained by the spacer 22 inside the sealant 55 between the first and second substrates 1 and 21. However, when in a high temperature environment, the liquid crystal material 8 may expand. In particular, as voltages are applied to the liquid crystal display panel, the temperature inside the liquid crystal display panel increases. Further, the temperature inside the liquid crystal display panel is increased by the heat generated from a back light device.

As the liquid crystal material 8 expands, the liquid crystal material 8 pushes the first and second substrates 1 and 21 outwardly and the spacer 22 is separated from the first substrate 1 or the second substrate 21. As a result, the cell gap between the first and second substrates 1 and 21 becomes larger than the spacer 22 and the liquid crystal material flows downwardly because of gravity, thereby generating spots at the lower corner area of the liquid crystal display panel by the difference of the gray, which is called a gravity mura, and resulting in a defect. Accordingly, the cell gap of the liquid crystal display panel according to the related art becomes uneven and provides a poor image.

SUMMARY OF THE INVENTION

Accordingly, the present invention is directed to a liquid crystal display panel and a fabrication method thereof that substantially obviate one or more of the problems due to limitations and disadvantages of the related art.

An object of the present invention is to provide a liquid crystal display panel and a fabrication method thereof that prevent a gravity defect and improve an image quality of the liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display panel includes first and second substrates being bonded by a sealant, and an elastic barrier formed between the first and second substrates inside the sealant, the elastic barrier and the sealant having a distance therebetween.

In another aspect, a fabricating method of a liquid crystal display panel includes the steps of: forming an elastic barrier on at least one of first and second substrates, and forming a sealant on at least one of the first and second substrates, the sealant and the elastic barrier having a distance therebetween when the first and second substrates are bonded to each other.

In yet another aspect, a liquid crystal display panel device includes a liquid crystal display panel including first and second substrates, a sealing pattern at an image non-display region of the liquid crystal display panel to attach the first and second substrates to each other, and a liquid crystal layer between the first and second substrates and not contacting the sealing pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 5:
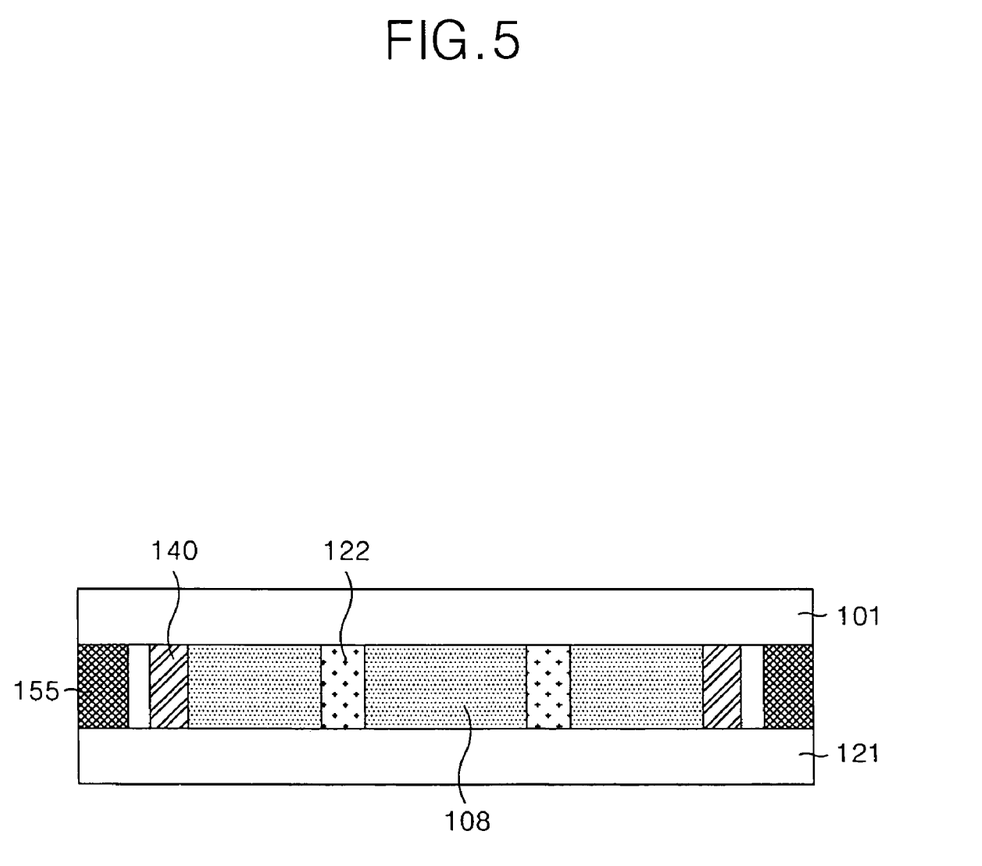
FIG. 5 is a cross-sectional view of a liquid crystal display panel according to an embodiment of the present invention.

FIG. 5 is a cross-sectional view of a liquid crystal display panel according to an embodiment of the present invention. In FIG. 5, a liquid crystal display panel includes a first substrate 101 and a second substrate 121 with a liquid crystal material 108 sandwiched therebetween. In particular, the first and second substrates 101 and 121 may be bonded to each other by a sealant 155 along a peripheral region of the liquid crystal display panel. In addition, the first and second substrates 101 and 121 have a predetermined cell gap therebetween maintained by a spacer 122. Further, an elastic layer 140 is formed on one of the first and second substrates 101 and 121. In particular, the elastic layer 140 is formed inside the sealant 155, and the liquid crystal material 108 is formed inside the elastic layer 140 between the first and second substrates 101 and 121.

The first substrate 101 may be a color filter array substrate and may have a black matrix, a color filter, common electrode and an upper alignment layer (not shown) formed thereon. Although not shown, the color filter may includes color filters of red, green and blue to transmit light of specific wavelength ranges, thereby displaying color lights, and the black matrix may be formed between adjacent color filters to absorb the light incident from the adjacent cells, thereby preventing a color contrast from being deteriorated.

In addition, the second substrate 121 may be a thin film transistor (TFT) array substrate and may have data lines, gate lines and a lower alignment layer (not shown) formed thereon. Although not shown, the data lines and the gate lines may intersect each other, thereby defining a plurality of cell areas, and a gate insulating film may be formed between the data lines and the gate lines. Further, a TFT (not shown) may be formed at each intersection between the data lines and the gate lines, and may include a gate electrode connected to a respective one of the gate lines, a source electrode connected to a respective one of the data lines, and a drain electrode facing the source electrode with a channel region that includes an active layer and an ohmic contact layer. In addition, although not shown, the TFT may be electrically connected to the pixel electrode through a contact hole of a protective film, such that the TFT responds to a gate signal from the respective gate line to selectively supply the data signal from the respective data line to the pixel electrode.

Moreover, the elastic layer 140 may be an elastic barrier having a columnar shape and may be formed of a urethane group resin having the composition as shown in Table 1.

TABLE 1

| Urethane Resin | Aromatic Diisocyanate | Polyol | Dihydric or trihydric alcohol |
|---|---|---|---|
| Composition | 20~30% | 20~30% | 40~60% |

The aromatic diisocyanate may include one or more of 4,4'-diphenylmethane diisocyanate MDI; 2,4- or 2,6-toluene diisocyanate TDI; carbodiimide-modified MDI; polymeric MDI, and the like. The polyol may include one of polypropylene ether glycol PPG, polytetramethylene ether glycol PTMEG, and the like. The dihydric alcohol may include one of 1,4-butanediol; 1,3-butanediol; 1,6-hexanediol; diethylene glycol DEG; ethylene glycol EG; tripropylene glycol TPG, and the like. Further, the trihydric or above alcohol may include one of glycerin, trimethylene propane TMP, sorbitol, and the like.

Figure 6:
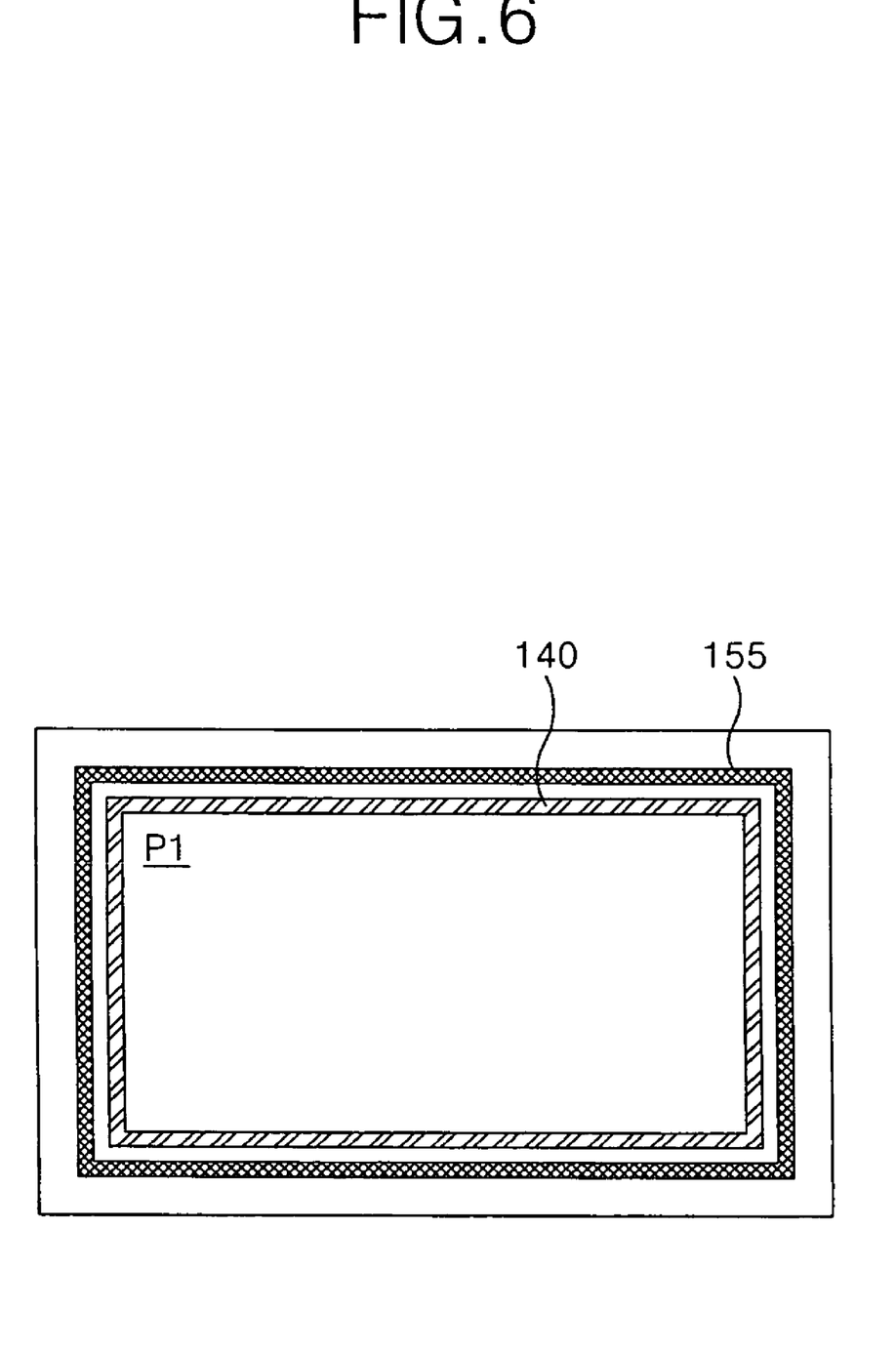
FIG. 6 is a planar view of the liquid crystal display panel shown in FIG. 5.

FIG. 6 is a planar view of the liquid crystal display panel shown in FIG. 5. As shown in FIG. 6, the sealant 155 formed on one of the first and second substrates 101 and 121 (shown in FIG. 5). In particular, the sealant 155 may include a glass fiber and may be spread along the entire peripheral edge of the liquid crystal display panel. In addition, the sealant 155 and the elastic layer 140 may have a predetermined distance therebetween, and the elastic layer 140 may be formed parallel to the sealant 155. As a result, the liquid crystal material 108 is formed within the space P1 between the first and second substrates 101 and 121 (shown in FIG. 5) inside the elastic layer 140. Although not shown, the elastic layer 140 may be formed along only portions of the peripheral edge of the liquid crystal display panel, e.g., in an U-pattern, so long as the elastic layer 140 effectively contains the liquid crystal material 108 to prevent a gravity defect.

Figure 7:
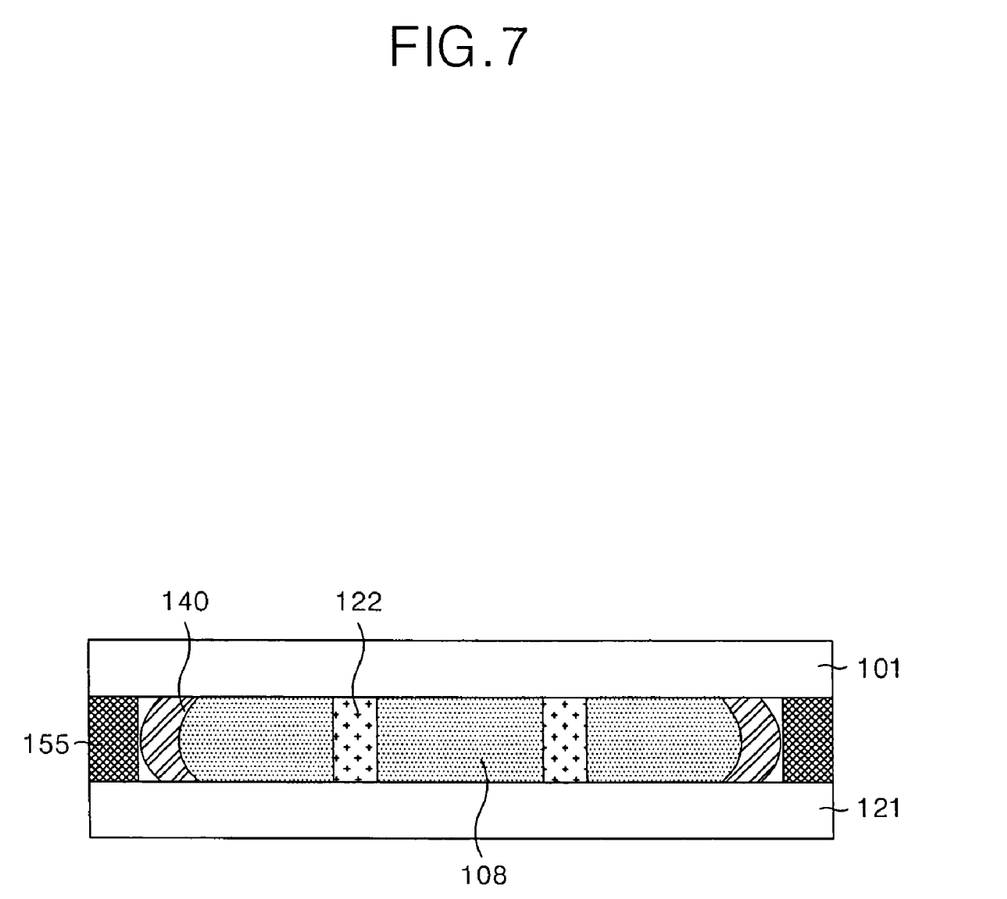
FIG. 7 is a cross-sectional view of the liquid crystal display panel shown in FIG. 5 in a high temperature environment.

FIG. 7 is a cross-sectional view of the liquid crystal display panel shown in FIG. 5 in a high temperature environment. As shown in FIG. 7, in a high temperature environment, the liquid crystal material 108 may expand. Since the elastic layer 140 is elastic, the elastic layer 140 is bent by the expansion force of the liquid crystal material 108 before the first and second substrates 101 and 121 would be bent.

As a result, as the liquid crystal material 108 expands, the liquid crystal material 108 pushes the elastic layer 140 toward the sealant 155. Thus, the elastic layer 140 bends into the space between itself and the sealant 155 by the expansion force of the liquid crystal material 108 and contains the liquid crystal material 108 in the cell gap. In particular, the elastic layer 140 is pushed as much as the volume of the liquid crystal material 108 expands. Thus, the distance between the elastic layer 140 and the sealant 155 may be predetermined based on an expansion volume of the liquid crystal material 108. Accordingly, the spacer 122 is not separated from the first substrate 101 or the second substrate 121 as the liquid crystal material 108 expands, and the cell gap is maintained even in the high temperature environment, thereby preventing a gravity defect.

Figure 8:
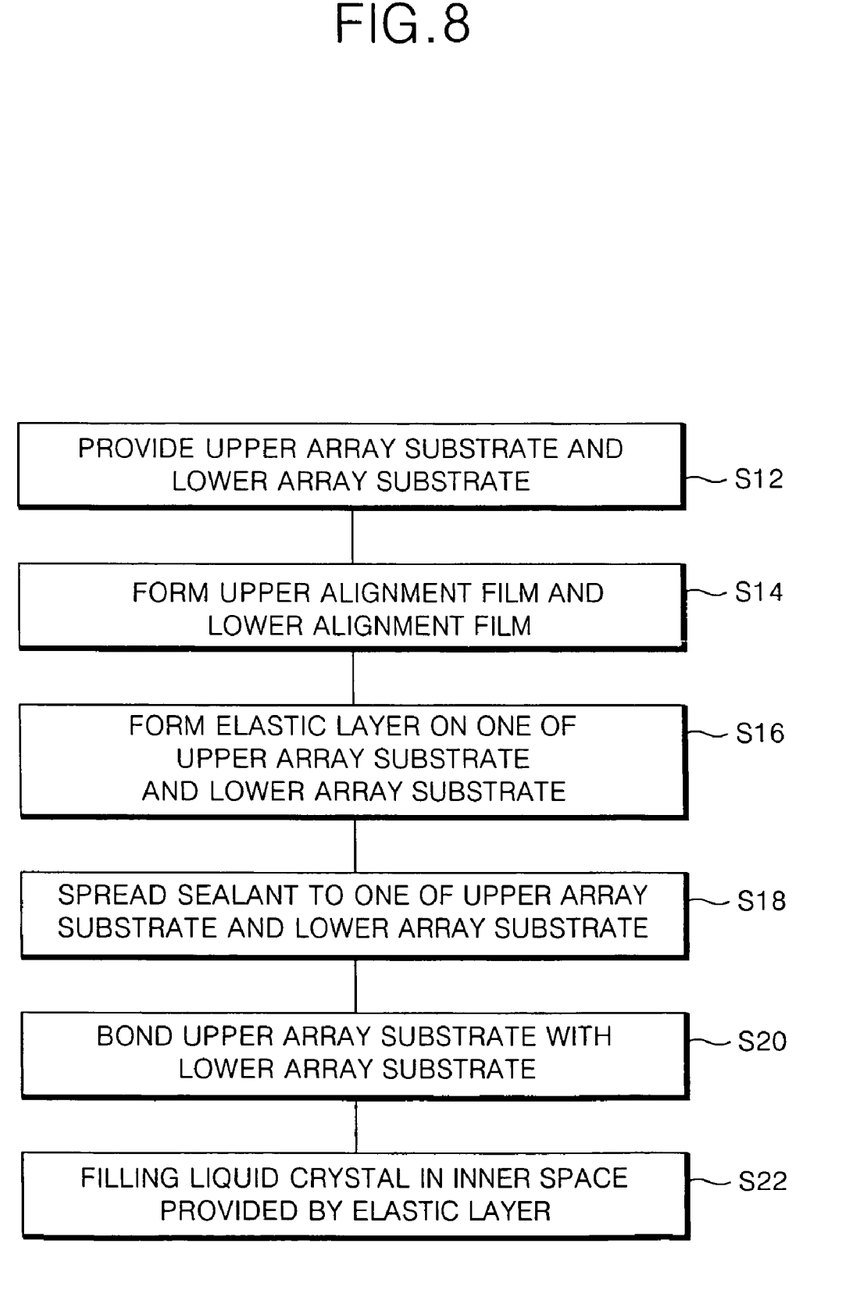
FIG. 8 is a flow chart illustrating a fabricating method of a liquid crystal display panel according to an embodiment of the present invention.

FIG. 8 is a flow chart illustrating a fabricating method of a liquid crystal display panel according to an embodiment of the present invention. As shown in FIG. 8, at step S12, an upper array substrate and a lower array substrate are provided. For instance, the first substrate 101 and the second substrate 121 may be separately prepared, i.e., forming a black matrix, a color filter, and a common electrode on the first substrate 101, and forming data lines, gate lines, TFTs and pixel electrodes on the second substrate 121.

Then, at step S14, an upper alignment film and a lower alignment film may be formed on the upper and lower array substrates, respectively. For instance, the upper alignment film is formed on the first substrate 101 over the black matrix, the color filter, and the common electrode, and the lower alignment film is formed on the second substrate 121 over the data lines, the gate lines, the TFTs and the pixel electrodes.

Further, at step S16, an elastic layer is formed on one of the upper and lower array substrates. For instance, a high elastic paste may be formed by mixing a urethane resin with a solvent, i.e., cyclohexane, based on the composition shown in Table 2, and such a high elastic paste may be screen printed or coated on one of the first and second substrates 101 and 121 to form the elastic layer 140 (shown in FIG. 5).

TABLE 2

| Urethane Resin | Aromatic Diisocyanate | Polyol | Dihydric or trihydric alcohol |
|---|---|---|---|
| Composition | 20~30% | 20~30% | 40~60% |

In particular, the aromatic diisocyanate may include one or more 4,4'-diphenylmethane diisocyanate MDI; 2,4- or 2,6-toluene diisocyanate TDI; carbodiimide-modified MDI; polymeric MDI and the like. The polyol may include polypropylene ether glycol PPG, polytetramethylene ether glycol PTMEG and the like. The dihydric alcohol may include 1,4-butanediol; 1,3-butanediol; 1,6-hexanediol; diethylene glycol DEG; ethylene glycol EG; tripropylene glycol TPG and the like. Further, the trihydric or above alcohol may include glycerin, trimethylene propane TMP, sorbitol and the like.

Then, at step S18, a sealant is spread on one of the upper array substrate and the lower array substrate. For example, the sealant 155 (shown in FIG. 5) may be formed by spreading a sealant material on one of the first substrate 101 and the second substrate 121. The sealant material may include a glass fiber. Moreover, at step S20, the upper and lower array substrates are bonded to each other. For example, the first and second substrates 101 and 121 are bonded to each other by the sealant 155 (shown in FIG. 5).

Furthermore, at step S22, a liquid crystal material is injected into an inner space provided by the elastic layer between the upper and lower array substrates. For example, the liquid crystal material 108 is injected between the first and second substrates 101 and 121 (shown in FIG. 5).

Accordingly, the liquid crystal display panel and the fabricating method thereof according to an embodiment of the present invention includes the elastic layer 140 formed parallel to the sealant 155 and inside the sealant 155, and has the liquid crystal material 108 filled into the inner space P1 provided by the elastic layer 140. Accordingly, the elastic layer 140 is pushed in the liquid crystal expansion direction when the liquid crystal display panel is exposed to the high temperature environment, e.g., the heat generated by the light of a back light device, thereby accommodating the volume expansion of the liquid crystal material 108. Hence, a gravity defect occurring when a cell gap is stretched by the liquid crystal material expansion or the substrate is deformed, is prevented, thereby improving an image quality.

As described above, the liquid crystal display panel and the fabricating method thereof according to an embodiment of the present invention includes the elastic layer formed inside of the sealant, and has the liquid crystal is contained in the inner space provided by the elastic layer. Accordingly, the elastic layer is pushed in the liquid crystal expansion direction when the liquid crystal display panel is exposed to the high temperature environment thereby expanding the inner space for containing the liquid crystal material. Hence, a gravity defect occurring when a cell gap is stretched by the liquid crystal material expansion or the substrate is deformed, is prevented, thereby improving an image quality.

It will be apparent to those skilled in the art that various modifications and variations can be made in the liquid crystal display panel and the fabrication method thereof of the present invention without departing from the sprit or scope of the invention. Thus, it is intended that the present invention covers the modifications and variations of this invention provided they come within the scope of the appended claims and their equivalents.

What is claimed is:

1. A liquid crystal display panel, comprising:

first and second substrate being bonded by a sealant, wherein the sealant has a shape of a closed-shape;

an elastic barrier formed of a different material from the sealant, at a distance from the sealant inside the entire sealant between the first and second substrates, wherein the elastic barrier has a shape of a smaller closed-loop than the sealant, wherein the elastic barrier is formed of a urethane group resin having an aromatic diisocyanate of about 20~30%, a polyol of about 20~30%, and a dihydric or trihydric alcohol of about 40~60%; and a liquid crystal layer between the first and second substrates inside the elastic barrier, wherein the elastic barrier is bent toward the sealant when the liquid crystal layer expands so that the cell gap between the first and the second substrates are maintained constantly.

2. The liquid crystal display panel according to claim 1, wherein the aromatic diisocyanate includes 4,4'-diphenyl methane diisocyanate MDI.

3. The liquid crystal display panel according to claim 1, wherein the alcohol includes 1,4-butanediol.

4. The liquid crystal display panel according to claim 1, wherein the elastic barrier and the sealant are substantially parallel to each other.

5. The liquid crystal display panel according to claim 1, wherein the distance is determined based on a volume expansion of a liquid crystal material between the first and second substrates.

* * * * *